US007335620B2

(12) United States Patent
Ito et al.

(10) Patent No.: US 7,335,620 B2
(45) Date of Patent: *Feb. 26, 2008

(54) PHOTOCATALYTIC POWDER, PHOTOCATALYTIC SLURRY, AND POLYMER COMPOSITION, COATING AGENT, PHOTOCATALYTIC FUNCTIONAL MOLDED ARTICLE AND PHOTOCATALYTIC FUNCTIONAL STRUCTURE USING THE POWDER

(75) Inventors: Katsura Ito, Nagano (JP); Hiroyuki Hagihara, Toyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,327

(22) Filed: Dec. 2, 2003

(65) Prior Publication Data

US 2004/0121903 A1  Jun. 24, 2004

Related U.S. Application Data

(62) Division of application No. 09/839,418, filed on Apr. 23, 2001, now Pat. No. 6,683,023.

(60) Provisional application No. 60/270,156, filed on Feb. 22, 2001.

(30) Foreign Application Priority Data

| Apr. 21, 2000 | (JP) | ............................ P2000-120229 |
| Feb. 15, 2001 | (JP) | ............................ P2001-037799 |

(51) Int. Cl.
| B01J 27/00 | (2006.01) |
| B01J 29/04 | (2006.01) |
| B01J 21/18 | (2006.01) |
| B01J 23/00 | (2006.01) |
| B32B 27/00 | (2006.01) |

(52) U.S. Cl. ................. 502/208; 502/62; 502/182; 502/168; 502/216; 502/224; 502/325; 502/326; 502/329; 502/330; 502/331; 502/339; 502/343; 502/344; 502/345; 502/347; 502/350; 423/610; 428/375; 428/378; 428/386; 428/516; 428/530; 428/537.1; 428/537.5; 428/528

(58) Field of Classification Search ................. 502/62, 502/182, 325, 326, 329, 330, 331, 339, 343, 502/344, 345, 347, 350; 106/436; 524/497; 523/204, 207; 428/375, 378, 386, 516, 530, 428/537.1, 537.5
See application file for complete search history.

(56) References Cited

U.S. PATENT DOCUMENTS

| 4,241,042 | A |   | 12/1980 | Matijevic et al. |  |
| 4,944,936 | A | * | 7/1990 | Lawhorne | ................ 423/612 |
| 5,227,342 | A |   | 7/1993 | Anderson et al. |  |
| 5,231,067 | A | * | 7/1993 | Deller et al. | ................ 502/350 |
| 5,366,938 | A | * | 11/1994 | Deller et al. | ................ 501/134 |
| 5,684,116 | A |   | 11/1997 | Martl et al. |  |
| 5,965,479 | A | * | 10/1999 | Suzuki et al. | ................ 502/182 |
| 5,981,425 | A |   | 11/1999 | Taoda et al. |  |
| 6,017,993 | A | * | 1/2000 | Maeda et al. | ................ 524/497 |
| 6,066,359 | A | * | 5/2000 | Yao et al. | ................ 427/126.3 |
| 6,090,736 | A | * | 7/2000 | Taoda et al. | ................ 502/5 |
| 6,107,390 | A | * | 8/2000 | Maeda et al. | ................ 524/497 |
| 6,123,927 | A | * | 9/2000 | Ogawa et al. | ................ 424/59 |
| 6,245,140 | B1 | * | 6/2001 | Monden et al. | ........... 106/286.4 |
| 6,265,341 | B1 | * | 7/2001 | Komatsu et al. | ............ 502/326 |
| 6,291,067 | B1 | * | 9/2001 | Taoda et al. | ................ 428/375 |
| 6,337,301 | B1 | * | 1/2002 | Ohmori et al. | ............. 502/350 |
| 6,383,980 | B1 | * | 5/2002 | Hagihara et al. | ........... 502/340 |
| 6,407,156 | B1 | * | 6/2002 | Hagihara et al. | ........... 524/494 |
| 6,479,031 | B2 | * | 11/2002 | Ohmori et al. | ............. 423/610 |
| 6,479,141 | B1 | * | 11/2002 | Sanbayashi et al. | ........ 428/323 |
| 6,627,336 | B1 | * | 9/2003 | Ohmori et al. | ............. 428/702 |
| 2002/0006866 | A1 | * | 1/2002 | Ohmori et al. | ............. 502/350 |
| 2002/0160910 | A1 | * | 10/2002 | Sanbayashi et al. | ........ 502/208 |

FOREIGN PATENT DOCUMENTS

| EP | 1064999 A1 | 1/2001 |
| JP | 10-137593 A | 5/1998 |
| JP | 11-279299 A | 10/1999 |
| JP | 11-293031 A | 10/1999 |
| WO | WO 8900983 A1 | 2/1989 |

OTHER PUBLICATIONS

Patent Abstracts of Japan, abstracting JP 10-137593A of May 26, 1998.
Database WPI, Section Ch, Week 199831, Derwent Publications, AN 1998-355590, XP002172223, abstracting JP 10-137593A of May 26, 1998.

* cited by examiner

*Primary Examiner*—Cam N. Nguyen
(74) *Attorney, Agent, or Firm*—Sughrue Mion, PLLC

(57) ABSTRACT

An object of the present invention is to provide a photocatalytic powder containing titanium dioxide fine particles containing an anionically active substance, where the electrokinetic potential of the fine particle is from about −100 to 0 mV in an aqueous environment at pH 5. Another object of the present invention is to provide a photocatalytic slurry containing the powder, and a polymer composition, a coating agent, a photocatalytic functional molded article and a photocatalytic functional structure using the powder.

17 Claims, No Drawings

PHOTOCATALYTIC POWDER, PHOTOCATALYTIC SLURRY, AND POLYMER COMPOSITION, COATING AGENT, PHOTOCATALYTIC FUNCTIONAL MOLDED ARTICLE AND PHOTOCATALYTIC FUNCTIONAL STRUCTURE USING THE POWDER

CROSS REFERENCE TO RELATED APPLICATIONS

This is a Divisional Application of prior application Ser. No. 09/839,418 filed Apr. 23, 2001, now U.S. Pat. No. 6,683,023 which is an application filed under 35 U.S.C. §111(a) claiming benefit pursuant to 35 U.S.C. §119(e)(1) of the filing date of Provisional Application 60/270,156 filed Feb. 22, 2001 pursuant to 35 U.S.C. §111(b); the disclosures of which are incorporated herein by reference.

FIELD OF THE INVENTION

The present invention relates to a material having photocatalytic activity, more specifically, the present invention relates to a photocatalytic powder material having photocatalytic activity, a slurry containing the photocatalytic powder, an organic polymer composition containing the photocatalytic powder, a photocatalytic functional molded article of the organic polymer composition, a coating agent comprising the photocatalytic slurry, and a photocatalytic functional structure having provided on the surface thereof the polymer composition or the coating agent.

BACKGROUND OF THE INVENTION

In recent years, photocatalytic fine particles using titanium dioxide are attracting attention as an environmental cleaning material for antimicrobial, deodorization, antifouling, air cleaning, water cleaning and the like. The photocatalytic mechanism of titanium dioxide is considered attributable to the following mechanism. Upon irradiation of light on a titanium dioxide fine particle, an electron and a hole are generated inside the titanium dioxide fine particle, which reacts with water or oxygen in the vicinity of the surface of a titanium dioxide fine particle to generate hydroxy radical or hydrogen peroxide. As a result, strong oxidation reduction activity of this hydroxy radical or hydrogen peroxide, harmful organic substances are decomposed into carbon dioxide and water, and thereby cleaned. Such photocatalytic activity of a titanium dioxide fine particle is thought to semipermanently continue as long as a titanium dioxide fine particle, light, water and oxygen are present.

By taking advantage of this photocatalytic property of titanium dioxide, as a representative application example, titanium dioxide fine particles are being kneaded into an easily handleable medium, such as fiber or a plastic molded article, or into a coating on the surface of a substrate, such as cloth or paper. However, decomposition or deterioration by the strong photocatalytic activity of titanium dioxide readily occurs not only on harmful organic materials or environmental pollutants but also on the medium itself such as fiber, plastic or paper and this is an obstacle to durability in practical use. Due to easy handleability of the titanium dioxide fine particle, a coating material comprising a mixture of titanium dioxide fine particles and a binder has been developed. However, an inexpensive binder having durability sufficiently high to overcome, for example, decomposition or deterioration on the medium has not yet been found.

JP-A-9-225319 (the term "JP-A" as used herein means an "unexamined published Japanese patent application") and JP-A-9-239277 disclose means for preventing and suppressing the deterioration of a resin medium or the deterioration of a binder due to the strong photocatalytic activity of titanium dioxide particles. The proposed means is a method of allowing a photo-inactive compound having such as aluminum, silicon and zirconium to be supported on a titanium dioxide particle in an archipelago shape having a steric barrier to retard the photocatalytic activity. According to this method, the photo-inactive compound is supported in an archipelago shape; however, specific sites of the resin medium or the binder disadvantageously remain present under the strong photocatalytic activity of titanium dioxide.

JP-A-10-244166 proposes a photocatalytic titanium dioxide obtained by coating a porous calcium phosphate on the surface of titanium dioxide. However, in this case, the photocatalytic activity disadvantageously decreases due to the coated calcium phosphate layer.

International Publication WO99/33566 discloses a powder material of titanium dioxide fine particles, where a porous coating layer of calcium phosphate is formed on at least a part of the surface of a titanium dioxide fine particle and an anionic surfactant is present at the interface therebetween.

With respect to a slurry containing titanium dioxide having photocatalytic activity, JP-A-10-142008 discloses an anatase-type titanium oxide-containing slurry which is obtained by heat-treating a titania sol, a titania gel form or a titania sol-gel mixture in a closed vessel simultaneously with a pressurization treatment and then dispersing using an ultrasonic wave or stirring the treated product.

JP-A-11-343426 discloses a photocatalytic coating material having excellent dispersion stability and specifically discloses a photocatalytic coating material containing, in a solvent, a silica sol and titanium oxide having a Raman spectrum peak in the range of 146 to 150 $cm^{-1}$ and being occupied by anatase type titanium dioxide in a ratio of 95% by mass or more.

Conventional techniques heretofore proposed cannot provide an industrially useful method for producing a photocatalytic powder material or slurry which can satisfy all of the photocatalytic activity, when used in combination with an organic material, durability and dispersion stability.

In view of these conventional techniques, an object of the present invention is to provide a photocatalytic powder material, a slurry containing the photocatalytic powder, an organic polymer composition containing the photocatalytic powder, a molded article of the organic polymer composition, a coating agent containing the slurry and a structure having provided on the surface thereof the organic polymer composition or the coating agent that can effectively and profitably perform removal of malodor, decompositional removal of harmful substances or pollutants in air, water draining or cleaning treatment, or disinfectant or antifungal action (hereinafter collectively called "environmental cleaning activity") and at the same time, have high dispersion stability, and therefore, be greatly enhanced in the industrial utility.

Particularly, the present invention provides a photocatalytic powder and a photocatalytic slurry, which can exhibit excellent photocatalytic activity, durability and dispersion stability when coated on the surface of fiber, paper or plastic material, kneaded into such a material, or used for a coating composition.

SUMMARY OF THE INVENTION

As a result of extensive investigations to attain the above-described objects, the present inventors have found that these objects can be attained by a photocatalytic powder material comprising a titanium dioxide fine particle containing an anionically active substance, wherein the electrokinetic potential of the fine particle is from about −100 to 0 mV in an aqueous environment at pH 5, and by a slurry containing the powder.

More specifically, the present invention provides the following embodiments.

(1) A photocatalytic powder comprising a titanium dioxide fine particles containing an anionically active substance, wherein the electrokinetic potential of the fine particle is from about −100 to 0 mV in an aqueous environment at pH 5.

(2) The photocatalytic powder as described in 1 above, wherein the fine particle has a primary particle size of about 0.001 to about 0.2 µm.

(3) The photocatalytic powder as described in 1 or 2 above, wherein the anionically active substance is at least one substance selected from the group consisting of condensed phosphoric acid, organic sulfonic acid, sulfuric acid and hydrofluoric acid.

(4) An aqueous slurry containing the photocatalytic powder described is in any one of 1 to 3 above.

(5) An organic polymer composition containing the photocatalytic powder described in any one of 1 to 3 above.

(6) A coating agent using the photocatalytic slurry described in 4 above.

(7) An organic polymer composition comprising the photocatalytic powder described in 5 above, wherein the organic polymer of the organic polymer composition is at least one selected from the group consisting of thermoplastic resin, thermosetting resin, synthetic resin, natural resin and hydrophilic polymer.

(8) An organic polymer composition comprising the photocatalytic powder described in 5 above, wherein the organic polymer composition is an article selected from the group consisting of a coating material, a coating composition, a compound and a masterbatch.

(9) The organic polymer composition containing a photocatalytic powder as described in 8 above, wherein the concentration of the photocatalytic powder in the organic polymer composition is from about 0.01 to about 80% by mass based on the entire mass of the composition.

(10) A photocatalytic functional molded article obtainable by molding the organic polymer composition containing a photocatalytic powder material described in any one of 7 to 9 above.

(11) The photocatalytic functional molded article as described in 10 above, which is a molded article selected from the group consisting of fiber, film and plastic.

(12) A photocatalytic functional structure having provided on the surface thereof the photocatalytic powder described in any one of 1 to 3 above.

(13) A photocatalytic functional structure having provided on the surface thereof the coating agent described in 6 above.

(14) A coating layer comprising the photocatalytic powder described in 1 or 2 above.

DESCRIPTION OF THE PRESENT INVENTION

The titanium dioxide for use in the present invention is fundamentally not limited in the crystal form or in the production process thereof as long as it has photocatalytic activity. For example, a titanium dioxide fine particle obtained by a vapor phase reaction starting from titanium halide, a titanium dioxide fine particle or sol obtained by wet-hydrolyzing a titanium halide solution, or a calcined product thereof, may be used.

The titanium dioxide fine particle for use in the present invention is not limited in the crystal form, as described above. However, from the viewpoint of attaining high performance as a photocatalyst, anatase and brookite are preferred. The titanium dioxide fine particle may also be a composite crystal-system fine particle of these crystal forms or containing such a crystal.

The titanium dioxide for use in the present invention preferably has an average primary particle size of about 0.001 to about 0.2 µm, more preferably from about 0.001 to about 0.1 µm. If the average primary particle size is less than about 0.001 µm, efficient production is difficult to attain and this is not practical, whereas if it exceeds about 0.2 µm, the photocatalytic performance of the titanium dioxide greatly decreases.

In the present invention, it is important that the fine powder mainly comprises the above-described titanium dioxide, that the titanium dioxide contains an anionically active substance and that the electrokinetic potential of the fine powder is from about −100 to 0 mV in an aqueous environment at pH 5. The term "mainly" used herein means more than 50%. The "anionically active substance" as used herein means a substance having a hydrophilic atom group showing anionic property in the molecule, the surface of which substance is readily rendered anionic in water due to its proton-donating property. Any substance satisfying these conditions may be used. For example, the substance having a hydrophilic atom group bearing an anion in the molecule (particularly, Bronsted acid) is at least one substance selected from the group consisting of condensed phosphoric acid, organic sulfonic acid, sulfuric acid and hydrofluoric acid. Examples of the condensed phosphoric acid include pyrophosphoric acid, tripolyphosphoric acid, tetrapolyphosphoric acid, trimetaphosphoric acid, tetrametaphosphoric acid and hexametaphosphoric acid. Examples of the organic sulfonic acid include methanesulfonic acid, ethanesulfonic acid, benzenesulfonic acid, toluenesulfonic acid and dodecylbenzenesulfonic acid. Among these, condensed phosphoric acid is preferred.

In the present invention, an anionically active substance compounded with titanium dioxide is present in the vicinity of the surface of a fine particle, an anionically substance is adsorbed to the surface of a titanium dioxide fine particle, or an anionically active substance is present in the vicinity of the surface of titanium dioxide. The powder material may be in any of these states.

In the present invention, the electrokinetic potential means a potential difference generated at the interface between a solid particle and water in contact with each other when they perform a relative motion. This electrokinetic potential is generally determined, for example, by a method of loading an electric field to both ends of a cell containing water having dispersed therein fine powder to cause electrophoresis and measuring the migration speed. For the measurement of the migration speed, a direct observation method through a microscope, a rotary prism method, a laser Doppler method, a laser rotary grating method, an image analysis method or a mass measuring method may be used.

Other than the electrophoresis method, a precipitation potential method, an electroosmosis method, a streaming potential method and an ultrasonic method may be used.

Among these, an electrophoretic light-scattering method is preferred, which is an electrophoresis method employing a laser Doppler speed measuring method. In the present invention, the electrokinetic potential at pH 5 must be from about −100 to 0 mV, preferably from about −50 to about −10 mV. If the electrokinetic potential value exceeds about 0, sufficiently high photocatalytic activity cannot be obtained and also, the dispersion stability is poor, whereas if the electrokinetic potential is less than about −100 mV, sufficiently high photocatalytic activity cannot be obtained.

In the present invention, the anionically active substance may be sufficient if it is present in a ratio based on titanium dioxide such that the electrokinetic potential of the fine particle is from about −100 to 0 mV in an aqueous environment at pH 5. For example, the anionically active substance is preferably in a ratio of about 0.1 to about 50 parts by mass, more preferably from about 0.2 to about 20 parts by mass, per about 100 parts by mass of titanium dioxide. If the ratio of the anionically active substance is less than about 0.1 part by mass, sufficiently high dispersion stability of the fine particle cannot be obtained, whereas if it exceeds about 50 parts by mass, the fine particle greatly decreases in the activity as a photocatalyst. The method for allowing the anionically active substance to be present on the surface of titanium dioxide is also not particularly limited. For example, the anionically active substance may be added in the initial stage or during the production of titanium dioxide, or the anionically active substance may be added in the surface treatment step after the completion of the production of titanium dioxide.

In the photocatalytic powder, a metal such as platinum, rhodium, ruthenium, palladium, silver, copper and zinc may be previously supported on the surface of a titanium dioxide fine particle. In this case, the titanium dioxide fine particle is more intensified in the environmental cleaning activity and the disinfectant or algicidal effect is also enhanced. The metal may also be supported on the raw material titanium dioxide or a step of allowing the metal to be supported may be provided in the process of incorporating the above-described anionically active substance.

The slurry of the present invention is an aqueous dispersion comprising a photocatalytic powder material which is a fine particle mainly comprising a titanium dioxide fine particle and further containing an anionically active substance and in which the electrokinetic potential of the fine particle is from about −100 to 0 mV in an aqueous environment at pH 5. A hydrophilic organic solvent may be added to this aqueous dispersion.

The content ratio of the photocatalytic powder in the slurry is not particularly limited but is preferably, for example, from about 0.01 to about 50% by mass, more preferably from about 1 to about 40% by mass. If the content of the photocatalytic powder is less than about 0.01% by mass, a sufficiently high photocatalytic effect may not be obtained after the coating, whereas if it exceeds about 50% by mass, not only a problem such as increase in viscosity may be caused, but also is disadvantageous in view of profitability.

A photocatalytic functional structure may be produced by adding a freely selected binder to the above-described aqueous dispersion (slurry) to form a coating agent and coating such aqueous dispersion on the surface of various structures, which are described later. In the present invention, the binder material is not limited but, for example, at least one selected from hydrophilic polymers, such as polyvinyl alcohol, sodium polyacrylate and poly(N-vinylacetamide), and inorganic materials, such as zirconium compound, may be used.

Examples of the zirconium compound include zirconium oxychloride, zirconium hydroxychloride, zirconium nitrate, zirconium sulfate, zirconium acetate, ammonium zirconium carbonate and zirconium propionate.

Specifically, the amount of the binder added to the coating agent is preferably, for example, from about 0.01 to about 20% by mass, more preferably from about 1 to about 10% by mass. If the content of the binder is less than about 0.01% by mass, sufficiently high adhesion may not be attained after the coating, whereas if it exceeds about 20% by mass, not only a problem, such as increase in viscosity, may be caused, but also is disadvantageous in view of profitability.

The photocatalytic powder of the present invention can be used as a composition by adding it to an organic polymer. The organic polymer which can be used here includes thermoplastic resin, thermosetting resin, synthetic resin, natural resin and hydrophilic polymer. By incorporating the above-described anionically active substance to the titanium dioxide, the occurrence of the organic polymer directly contacting the active face (surface) of the photocatalyst is reduced, and therefore, the organic polymer substrate itself is scarcely subject to decompositional deterioration.

Examples of this organic polymer include polyethylene, nylon 6, nylon 66, polyvinyl chloride, polyvinylidene chloride, polyester, polypropylene, polyethylene oxide, polyethylene glycol, polyethylene terephthalate, silicon resin, polyvinyl alcohol, vinyl acetal resin, polyacetate, ABS resin, epoxy resin, vinyl acetate resin, cellulose, cellulose derivatives, polyamide resin, polyurethane resin, polycarbonate resin, polystyrene rein, urea resin, fluororesin, polyvinylidene fluoride, phenol resin, celluloid, chitin, starch sheet, acrylic resin, unsaturated polyester, melamine resin, alkyd resin and rayon.

The organic polymer composition containing the photocatalytic powder for environmental cleaning of the present invention can be used in the form of a coating material, a coating composition, a compound or a masterbatch. The concentration of the photocatalyst in the organic polymer composition is from about 0.01 to about 80% by mass, preferably from about 1 to about 50% by mass, based on the entire mass of the composition. In this polymer composition, an absorbent such as activated carbon and zeolite may be added to enhance the effect of removing malodorous substances. In the present invention, a polymer molded article having a function of cleaning the environment can be obtained by molding the above-described polymer composition. Examples of the molded article of the composition include fiber, film and plastic molded article.

The polymer composition of the present invention has excellent durability and therefore, may also be used as a coating composition for a structure such as wall material, glass, billboard or road construction concrete. Furthermore, when the titanium dioxide or polymer composition of the present invention is subjected to a surface treatment, its photocatalytic function can be fully exhibited without causing any photocatalytic deterioration or destruction of the medium (structure or coating), even if coated on a structure (organic material), such as paper, plastic, cloth or wood, or on a body coating of a car or the like.

EXAMPLES

The present invention is described in greater detail below by referring to the Examples, however, the present invention should not be construed as being limited to these Examples. Unless indicated otherwise herein, all parts, percents, ratios and the like are by weight.

Example 1

To 476 ml of previously weighed pure water, 0.01 g of sodium hexametaphosphate (extra pure reagent, produced by JUNSEI CHEMICAL CO., LTD.) was added. While stirring with a lab stirrer, the resulting mixture was heated and kept at a temperature of 98° C. Thereto, 36 g of Aqueous Titanium Tetrachloride Solution (produced by SHOWA TITANIUM CO., LTD.) was added dropwise over 60 minutes. After the dropwise addition, the obtained white suspension was adjusted to pH 5 using an electrodialyser. A part of the thus-obtained photocatalytic slurry was sampled and the solid concentration was measured by a dry constant weight method and found to be 2.1% by mass. The dry powder was subjected to a structural analysis using an X-ray diffractometer, and the obtained powder was determined to be brookite-type titanium dioxide. Then, the obtained powder was analyzed by FT-IR (FT-IR1650, manufactured by Perkin Elmer, Inc.). As a result, an absorption of metaphosphoric acid was observed, revealing the presence of an anionically active substance. Also, the primary particle size of the powder was determined from the measurement results of BET specific surface area and found to be 0.015 μm.

Evaluation of Photocatalytic Activity

Then, a coating solution containing 3% by mass of this powder (using zirconium oxychloride as the binder and the amount added thereof was 20% by mass based on the powder) was prepared and coated on a commercially available glass plate by a flow coating method and on the surface thereof, a red ink was dropped. The thus-obtained sample was placed right under a commercially available black light and after lighting of the light, the relative red ink discoloration rate was measured and found to be 130.

Evaluation of Resin Deterioration

Using 10 g of the photocatalytic powder prepared above and polyethylene terephthalate resin, a kneaded mixture having a titanium dioxide concentration of 20% was produced at a temperature of 280° C. by means of a commercially available batch-system kneader (Laboplasto mill manufactured by Toyo Seiki Seisaku-sho, Ltd.). From the obtained compound, a specimen of 3 cmφ×1 cm ("φ" used herein represents "diameter") was manufactured using a heating press and the yellow degree (YI value according to ASTM-D1925) of the specimen was measured by a spectrocolorimeter (CM-2002, manufactured by Minolta Co., Ltd.). Change for yellow was not observed.

Evaluation of Dispersibility

Using a part of the photocatalytic slurry, the dispersion particle size was evaluated by a commercially available ultrafine particle size distribution measuring apparatus by a laser Doppler method (UPA, manufactured by Microtrac Co., Ltd.), and found to be 0.17 μm in terms of the average particle size.

Evaluation of Electrokinetic Potential

A part of the photocatalytic slurry was sampled and measured on the electrokinetic potential using a commercially available electrokinetic potential measuring apparatus (DELSA440, manufactured by Beckman Coulter, Inc.) and found to be −35 mV.

Example 2

A photocatalytic powder containing an anionically active substance was produced in the same manner as in Example 1 except for using acidic sodium pyrophosphate (a product by TAIHEI CHEMICAL INDUSTRIAL CO., LTD.) in place of sodium hexametaphosphate. The thus-obtained photocatalytic powder was subjected to the photocatalytic activity evaluation, the resin deterioration evaluation, the dispersion particle size evaluation and the electrokinetic potential evaluation in the same manner as in Example 1. The results obtained are shown in Table 1.

Example 3

A photocatalytic powder containing an anionically active substance was produced in the same manner as in Example 1 except for using orthophosphoric acid (extra pure reagent produced by Wako Pure Chemical Industries, Ltd.) in place of sodium hexametaphosphate. The thus-obtained photocatalytic powder was subjected to the photocatalytic activity evaluation, the resin deterioration evaluation, the dispersion particle size evaluation and the electrokinetic potential evaluation in the same manner as in Example 1. The results obtained are shown in Table 1.

Example 4

In a 1 L-volume flask, 476 ml of pure water was weighed, heated while stirring with a lab stirrer and kept at a temperature of 98° C. Thereto, 36 g of Aqueous Titanium Tetrachloride Solution (produced by SHOWA TITANIUM CO., LTD.) was added dropwise over 60 minutes. After the dropwise addition, the obtained white suspension was adjusted to pH 5 using an electrodialyser. To this solution, 0.1 g of sodium hexametaphosphate (extra pure reagent, produced by JUNSEI CHEMICAL CO., LTD.) was added. The resulting slurry was charged into a 2.4 L-volume pot mill previously filled with 2 kg of zirconia beads of 0.8 mm and mixed at a rotational frequency of 100 rpm to obtain a photocatalytic slurry containing an anionically active agent. A part of this slurry was sampled and the solid concentration was measured by a dry constant weight method and found to be 1.9% by mass. The dry powder was subjected to a structural analysis using an X-ray diffractometer, and the obtained powder was brookite-type titanium dioxide. Then, the obtained powder was analyzed by FT-IR (FT-IR1650, manufactured by Perkin Elmer, Inc.), and an absorption of metaphosphoric acid was observed, revealing the presence of an anionically active substance.

Comparative Example 1

In a 1 L-volume flask, 476 ml of pure water was weighed, heated while stirring with a lab stirrer and kept at a temperature of 98° C. Thereto, 36 g of an aqueous titanium tetrachloride solution (produced by SHOWA TITANIUM CO., LTD.) was added dropwise over 60 minutes. After the dropwise addition, the obtained white suspension was adjusted to pH 5 using an electrodialyser. A part of this slurry was sampled and the solid concentration was measured by a dry constant weight method and found to be 2.1% by mass. The dry powder was subjected to a structural analysis using an X-ray diffractometer, and the obtained powder was brookite-type titanium dioxide. Also, the primary particle size of the powder was determined from the specific surface area measured by a BET method and found to be 0.016 μm. Subsequently, the photocatalytic activity evaluation and the resin deterioration evaluation of the powder, and the dispersion particle size evaluation and the electrokinetic potential evaluation of the slurry were performed in the same manner as in Example 1. The results obtained are shown in Table 1.

Comparative Example 2

To 499 ml of pure water, 1 g of a commercially available photocatalytic powder material (ST-01, produced by Ishihara Sangyo Kaisha, Ltd.) was added, and the resulting mixture was dispersed by a lab stirrer to obtain a photocatalytic slurry. Using original powder, the photocatalytic activity evaluation and the resin deterioration evaluation were performed in the same manner as in Example 1. Also, using the photocatalytic slurry obtained above, evaluations of dispersion particle size and electrokinetic potential were performed in the same manner as in Example 1. The results obtained are shown in Table 1.

Comparative Example 3

To 499 ml of pure water, 1 g of a commercially available titanium dioxide for pigment (A220, produced by Ishihara Sangyo Kaisha, Ltd.) was added, and the resulting mixture was dispersed by a lab stirrer to obtain a photocatalytic slurry. To this solution, 0.1 g of sodium hexametaphosphoric acid (extra pure reagent produced by JUNSEI CHEMICAL CO., LTD.) was added. The resulting slurry was charged into a 2.4 L-volume pot mill previously filled with 2 kg of zirconia beads of 0.8 mm and mixed at a rotational frequency of 100 rpm to obtain a photocatalytic slurry containing an anionically active agent. A part of this slurry was sampled and the solid concentration was measured by a dry constant weight method and found to be 1.9% by mass. Using the dry powder obtained here, the photocatalytic activity evaluation and the resin deterioration evaluation were performed in the same manner as in Example 1. Also, using the photocatalytic slurry obtained above, evaluations of dispersion particle size and electrokinetic potential were performed in the same manner as in Example 1. The results obtained are shown in Table 1.

Comparative Example 4

A photocatalytic powder material and a photocatalytic slurry were obtained in the same manner as in Example 1 except for changing the amount added of sodium hexametaphosphate to 0.001 g. Evaluations of photocatalytic activity, resin durability, dispersion particle size and electrokinetic potential were performed in the same manner as in Example 1. The results obtained are shown together in Table 1.

Comparative Example 5

A photocatalytic powder material and a photocatalytic slurry were obtained in the same manner as in Example 1 except for changing the amount added of sodium hexametaphosphate to 0.7 g. Evaluations of photocatalytic activity, resin durability, dispersion particle size and electrokinetic potential were performed in the same manner as in Example 1. The results obtained are shown together in Table 1.

TABLE 1

|  | Anionically Active Agent | Photo-Catalytic Activity | Primary Particle Size (μm) | Dispersion Particle Size (μm) | Resin Durability | Electrokinetic Potential (mV) |
|---|---|---|---|---|---|---|
| Example 1 | Present | 130 | 0.015 | 0.17 | ○ | −35 |
| 2 | Present | 120 | 0.016 | 0.19 | ○ | −33 |
| 3 | Present | 115 | 0.016 | 0.20 | ○ | −28 |
| 4 | Present | 122 | 0.015 | 0.18 | ○ | −34 |
| Comparative Example 1 | None | 95 | 0.016 | Immeasurable | X | 30 |
| 2 | None | 80 | 0.008 | 0.65 | X | 27 |
| 3 | None | 10 | 0.15 | 0.78 | ○ | 29 |
| 4 | Present | 96 | 0.015 | 0.54 | X | 5 |
| 5 | Present | 98 | 0.015 | 0.25 | ○ | −105 |

○: In the yellow degree test of resin, change for yellow was not observed.
X: In the yellow degree test of resin, change for yellow was observed.

The photocatalytic powder and slurry of the present invention are a useful material capable of effectively and profitably performing removal of malodor, decompositional removal of harmful substances or pollutants, water draining or cleaning treatment, or antibacterial or antifungal action. Also, the slurry of the present invention containing the photocatalytic powder has excellent dispersion stability, and therefore, utility in industry is greatly enhanced. Particularly, the present invention can provide a catalytic powder material and a catalytic slurry, which exhibit excellent photocatalytic activity, durability and dispersion stability when coated on the surface of fiber, paper or plastic material, kneaded into such a material, or used for a coating material composition.

While the invention has been described in detail and with reference to specific embodiments thereof, it will be apparent to one skilled in the art that various changes and modifications can be made therein without departing from the spirit and scope thereof.

What is claimed is:

1. A photocatalytic powder comprising titanium dioxide fine particles comprising an anionically active substance, wherein the fine particles have an electrokinetic potential of from about −100 mV to −10 mV in an aqueous environment at pH 5, and wherein the crystal form of the titanium dioxide fine particles is brookite.

2. The photocatalytic powder according to claim 1, wherein the fine particles have a primary particle size of about 0.001 to about 0.1 μm.

3. The photocatalytic powder according to claim 1, wherein the anionically active substance is at least one substance selected from the group consisting of condensed phosphoric acid, organic sulfonic acid, sulfuric acid and hydrofluoric acid.

4. An aqueous slurry comprising water and the photocatalytic powder claimed in claim 1.

5. A coating agent comprising a binder and the aqueous slurry claimed in claim 4.

6. A photocatalytic functional structure comprising a structure having provided on the surface thereof the coating agent claimed in claim 5.

7. The photocatalytic functional structure according to claim 6, wherein the structure is selected from the group consisting of paper, plastic, cloth, wood, body coating of a car, wall material, glass, billboard and road construction concrete.

8. An organic polymer composition comprising an organic polymer and the photocatalytic powder claimed in claim 1.

9. A photocatalytic functional molded article obtained by molding the organic polymer composition claimed in claim 8.

10. The organic polymer composition according to claim 8, wherein the organic polymer is at least one polymer selected from the group consisting of polyethylene, nylon 6, nylon 66, polyvinyl chloride, polyvinylidene chloride, polyester, polypropylene, polyethylene oxide, polyethylene glycol, polyethylene terephthalate, silicon resin, polyvinylalcohol, vinyl acetal resin, polyacetate, ABS resin, epoxy resin, vinyl acetate resin, cellulose, cellulose derivatives, polyamide resin, polyurethane resin, polycarbonate resin, polystyrene resin, urea resin, fluororesin, polyvinylidene fluoride, phenol resin, celluloid, chitin, starch sheet, acrylic resin, unsaturated polyester, melamine resin, alkyd resin and rayon.

11. The organic polymer composition according to claim 10, wherein the composition further comprises activated carbon and/or zeolite.

12. A photocatalytic functional structure comprising a structure having provided on the surface thereof the photocatalytic powder claimed in claim 1.

13. The photocatalytic functional structure according to claim 12, wherein the structure is selected from the group consisting of paper, plastic, cloth, wood, body coating of a car, wall material, glass, billboard and road construction concrete.

14. A coating layer comprising the photocatalytic powder claimed in claim 1.

15. The photocatalytic powder according to claim 1, wherein metals are supported on the surface of the titanium dioxide fine particles.

16. The photocatalytic powder according to claim 15, wherein the metal comprises at least one metal selected from the group consisting of platinum, rhodium, ruthenium, palladium, silver, copper and zinc.

17. A photocatalytic powder comprising titanium dioxide fine particles comprising an anionically active substance, wherein the fine particles have an electrokinetic potential of from about −100 mV to −10 mV in an aqueous environment at pH 5, and wherein the titanium dioxide fine particles is a composite crystal-system of anatase and brookite.

* * * * *